US009355226B2

United States Patent
Pathak

(10) Patent No.: US 9,355,226 B2
(45) Date of Patent: May 31, 2016

(54) DIGITAL RIGHTS MANAGEMENT SYSTEM IMPLEMENTED ON A SCANNER

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 64 days.

(21) Appl. No.: 14/290,626

(22) Filed: May 29, 2014

(65) Prior Publication Data

US 2015/0347719 A1  Dec. 3, 2015

(51) Int. Cl.
*G06F 7/04* (2006.01)
*G06F 21/10* (2013.01)
*G06F 21/62* (2013.01)

(52) U.S. Cl.
CPC ............ *G06F 21/10* (2013.01); *G06F 21/6209* (2013.01); *G06F 2221/07* (2013.01)

(58) Field of Classification Search
CPC ............... G06F 21/10; G06F 21/6218; G06F 17/30011; G06F 21/60; G06F 21/604; G06F 3/0482; G06F 3/04842; G06F 3/0488; G06F 21/6209; G06F 2221/07; H04L 63/105; H04L 63/205; H04N 1/4406; H04N 1/4426; H04N 1/444
USPC .......................................................... 726/28
See application file for complete search history.

(56) References Cited

U.S. PATENT DOCUMENTS

2008/0016533 A1\* 1/2008 Rothschild ......... H04N 7/17318
725/60
2014/0298488 A1\* 10/2014 Barber ................ G06F 21/6218
726/28

OTHER PUBLICATIONS

Canon U.S.A., Inc., "Safeguarding Information Within Documents and Devices", "http://www.usa.canon.com/CUSA/assets/app/pdf/ ISG_Security/brochure_run_iradv_security_.pdf", 8 pages, printed from the Internet on Feb. 28, 2014.
Adobe Systems Incorporated, "Adobe LiveCycle ES3 Overview: Rights Management", http://help.adobe.com/en_US/livecycle/10.0/ Overview/WS92d06802c76abadb2c8525912ddcb9aad9-7ff8.html, 7 pages, printed from the internet on Apr. 15, 2014.

(Continued)

*Primary Examiner* — Kambiz Zand
*Assistant Examiner* — Abiy Getachew
(74) *Attorney, Agent, or Firm* — Chen Yoshimura LLP

(57) ABSTRACT

In a digital rights management system where a scanner is connected to a rights management server, the process of applying digital rights protection is performed by the scanner, rather than the server, so that scanning and document protection can be done even when the server is not available. Upon scanning a document, the operator selects a rights management policy to be applied to the digital document. The scanner generates a document ID, embeds the document ID as metadata in the document, encrypts the document, and stores the document ID, policy ID of the selected policy, and encryption key as an entry in a local document-policy association table on the scanner. The scanner uploads the above information of the digital document to the server, which stores the information in a document-policy association table on server and uses it to perform document access control.

11 Claims, 3 Drawing Sheets

(56) References Cited

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.

Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

* cited by examiner 28, 37

| Policy ID | Other policy terms | User ID | View | Print | Copy |
|---|---|---|---|---|---|
| Policy1 | policy terms | User1 | Yes | Yes | Yes |
| | | User2 | Yes | Yes | |
| | | User3 | Yes | Yes | |
| Policy2 | policy terms | User1 | Yes | Yes | Yes |
| | | User3 | Yes | | Yes |
| | | User4 | Yes | | Yes |
| | | User5 | Yes | | Yes |
| | | ... | | | |
| ... | | | | | |

Fig. 3A 29, 38

| Document ID | Policy ID | Encryption key | etc. |
|---|---|---|---|
| Doc ID1 | Policy1 | Key1 | |
| Doc ID2 | Policy2 | Key2 | |
| Doc ID3 | Policy1 | Key3 | |
| ... | | | |

DIGITAL RIGHTS MANAGEMENT SYSTEM IMPLEMENTED ON A SCANNER

BACKGROUND OF THE INVENTION

1. Field of the Invention

This invention relates to digital rights management for scanned copies of documents, and in particular, it relates to a method implemented on a scanner for applying digital rights to scanned documents.

2. Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF). With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ Reader, the application program contacts the DRM server to request permission. The DRM server determines whether the requesting user has the right to access the document in the attempted manner (view, edit, print, etc.), by determining the policy associated with the document and then referring to the content of that policy. The DRM server then transmits an appropriate reply to the application program to grant or deny the access. If access is granted, the server's reply may contain a decryption key to decrypt the document.

Scanner devices (including multi-function printers (MFP) that have printing, scanning and copying functions integrated in one device, or a device that has only a scanning function) are used to scan hardcopy documents to generate digital documents. Some scanners are equipped with DRM management functions to manage digital rights of the digital documents created by the scanner. For example, in one known DRM system, a scanner is connected to the DRM server by a network. When an operator uses the scanner to scan a hardcopy document into a digital document, the scanner prompts the operator to specify a rights management policy to be associated with the digital document. The scanner transmits a copy of the scanned digital document to the DRM server along with the operator's selection of right management policy. The DRM server applies the policy to the digital document, e.g., by adding the document ID of the digital document to the database table and associates it with the policy ID of the selected policy, and also embedding the document ID in the metadata of the digital document. The DRM server sends the protected version of the digital document back to the scanner. The operator at the scanner can then distribute the protected document, for example, by storing it or emailing it to various users. Here, a protected document refers to a digital document that has a rights management policy applied to it by the DRM server. Later, when a user attempts to access the protected document, access control can be accomplished by the DRM system in the method described above. An example of a scanner having DRM functions is the Canon imageRUNNER ADVANCE device, described in a document entitled "Safeguarding information Within Documents and Devices," available on the internet at http://www.usa.canon.com/CUSA/assets/app/pdf/ISG_Security/brochure_run_iradv_security_pdf.

SUMMARY

In the above-described scanner device that implements DRM, the scanner relies on the DRM server to apply right management policies to digital documents to generate protected digital documents. One disadvantage of such a system is that if the DRM server is unavailable over the network, the scanned document cannot be properly protected by the DRM system. Thus, when the DRM server is not available, the scanner may prevent the user from scanning, which will cause inconvenience to the operator. Alternatively, the scanner can allow simple scanning without applying digital rights protection to the scanned digital document, which is an undesirable compromise.

Accordingly, the present invention is directed to a method and related apparatus for protecting digital documents that substantially obviates one or more of the problems due to limitations and disadvantages of the related art.

An object of the present invention is to apply right management policies to digital documents generated by a scanner without the involvement of the RMS server, so as to avoid the inconvenience to scanner operators when the RMS server is not available.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a system comprising a digital document generation apparatus connected to a digital rights management server via a network, for managing digital rights of scanned documents, wherein the method includes the following steps performed by the digital document generation apparatus: (a) storing a plurality of right management policies in a storage device local to the digital document generation apparatus, each right management policy defining user access rights with respect to digital documents with which the policy is to be associated; (b) generating a digital document; (c) receiving an operator input indicating a policy ID of a selected one of the plurality of rights management policies; (d) generating a unique document ID for the digital document; (e) embedding the document ID and information identifying the digital rights management server in metadata of the digital document; (f) encrypting the digital document using an encryption key; (g) storing the document ID, the policy ID and the encryption key as an entry in a local document-policy association table in the storage device local to the digital document generation apparatus; (h) storing or transmitting the document to a user, without permitting any access to content of the digital document; and (i) transmitting, after step (h), the document ID, the policy ID and the encryption key to the digital rights management server.

The method further includes the following steps performed by the server: (j) storing a plurality of right management policies in a storage device of the server, each right management policy defining user access rights which specifies a plurality of users having access rights to digital documents with which the policy is to be associated; (k) receiving the document ID, the policy ID and the encryption key from the digital document generation apparatus; and (l) storing the document ID, the policy ID and the encryption key as an entry in a document-policy association table in the storage device of the server.

The method further includes the following steps by the server: (m) receiving a request for access from a user computer, the request indicating a document ID of a digital document to be accessed and a user ID of a requesting user; (n) determining a policy ID associated with the document ID by referring to the document-policy association table in the storage device of the server; (o) determining an access permission of the requesting user by referring to the policy table using the policy ID and the user ID; and (p) transmitting a reply to the user computer based on the access permission determined in step (o).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods. One computer program product may include program code executed by a digital document generation apparatus to perform steps (a) through (i) above. Another computer program product may include program code executed by a digital rights management server to perform steps (j) through (p) above.

It is to be understood that both the foregoing general description and the following detailed description are exemplary and explanatory and are intended to provide further explanation of the invention as claimed.

BRIEF DESCRIPTION OF THE DRAWINGS

FIGS. 3A and 3B schematically illustrates a policy table and a document-policy association table, respectively, that can be used in the above embodiment.

DETAILED DESCRIPTION OF PREFERRED EMBODIMENTS

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., "Rights Management" (URL http://help.adobe.com/en_US/livecycle/10.0/Overview/WS92d06802c76abadb2c8525912ddcb9aad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc.

Embodiments of the present invention provide a method for restricting and/or controlling access to digital documents and tracking access to confidential information at the point of scanning physical copies. The control method is implemented in scanners and can be applied to protect digital documents even when the RMS server is not available.

Figure 1:
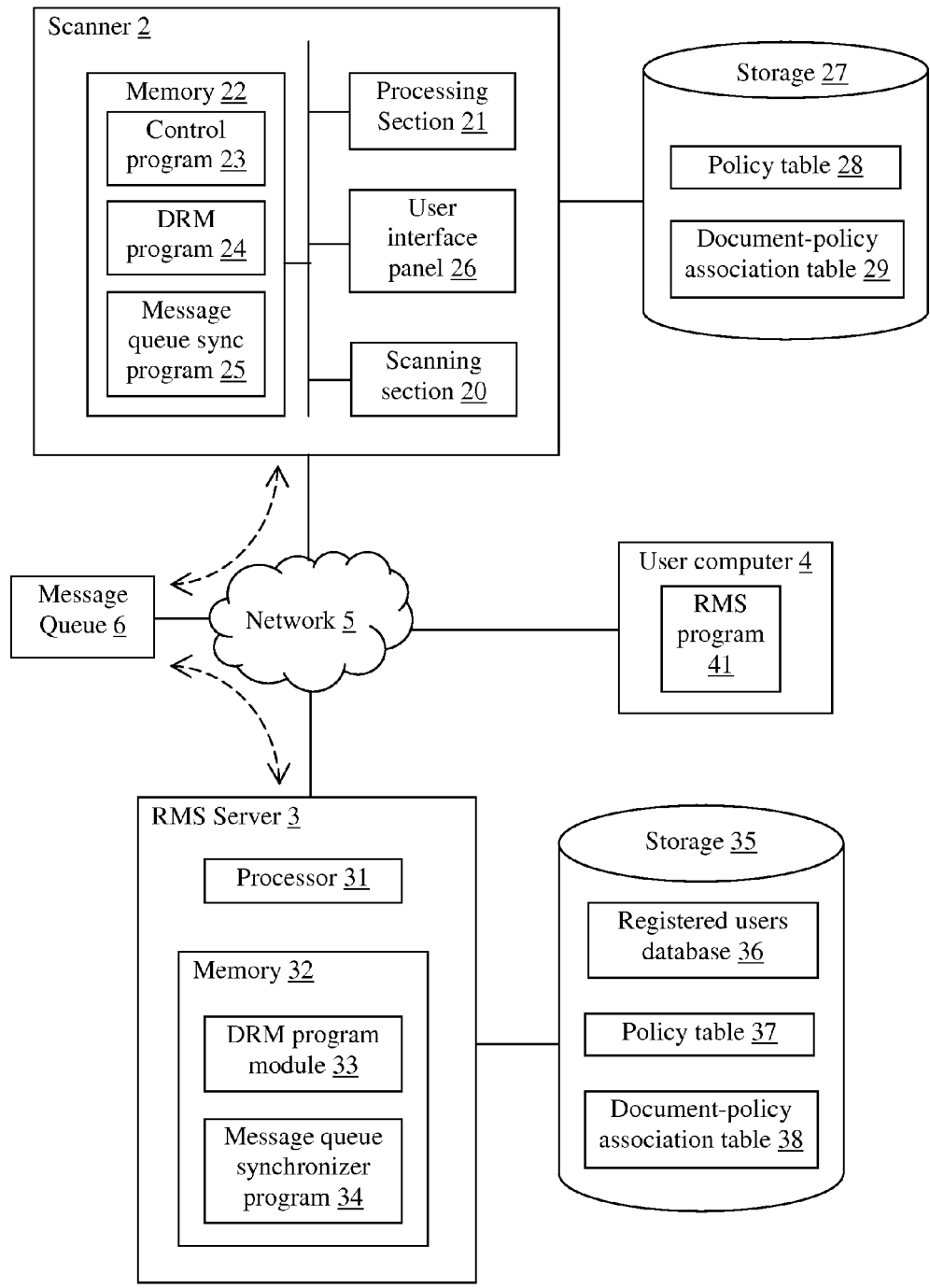
FIG. 1 schematically illustrates a digital rights management (RMS or DRM) system according to an embodiment of the present invention.

FIG. 1 schematically illustrates a digital rights management system (DRM or RMS) according to an embodiment of the present invention. The system includes a scanner device 2 (more generally, a digital document generation apparatus), a digital rights management server (RMS server) 3, as well as a user computer 4. The user computer 4 and scanner 2 may be connected to the RMS server 3 via a network 5 such as the Internet or an intranet of an organization; alternatively, the scanner 2 may be connected to the RMS server 3 via an intranet while the user computer 4 is connected to the RMS server 3 via the Internet.

The scanner device 2 includes a processing section 21, a memory 22 storing a control program 23, an DRM program 24 and a message queue synchronizer program 25, a user interface panel 26, and a scanning section 20 which includes hardware that performs the scanning functions. The scanner device 2 also has a storage device 27 (internal or external) which stores digital documents and DRM related tables and other information described later. The processing section 21 executes the control program 23 to control the various functions of the scanner 2, including various steps of the digital rights management method described later. The RMS server 3 includes a processor 31 which executes software programs stored in a memory 32 to perform various processes, including steps of the digital rights management method described later. The server 3 has a storage device 35 (internal or external) which stores digital documents and DRM related tables and other information described later (the digital documents and the various tables may be collectively referred to as the DRM database). The user computer 4 is installed with a rights management program 41 that cooperates with the server 3. The user computer 4 also includes a processor and memory where the program 41 is stored, but for simplicity they are not shown in FIG. 1. Although only one scanner 2 is shown in FIG. 1, multiple scanners are typically connected to the server.

The DRM database stored in storage device 35 of the RMS server 3 includes a registered users database 36 storing information regarding users that are registered in the DRM system, a policy table 37 containing a list of rights management policies, and a document-policy association table 38. The policy table 37 (an example of which is schematically shown in FIG. 3A) specifies, for each rights management policy identified by a policy ID, the user access rights, i.e., which user has what kind of access rights (e.g. view, print, copy, etc.) under the policy, as well as other optional polity terms such as the time period the policy will be in force, other restrictions, etc. The document-policy association table 38 (an example of which is schematically shown in FIG. 3B) contains a list of documents identified by unique document IDs (which may be a license ID), along with a policy ID of the policy associated with each document, as well as other information (optional)

about the document such as the encryption key used to encrypt the document, time of creation, license revoke status, etc.

Figure 2:
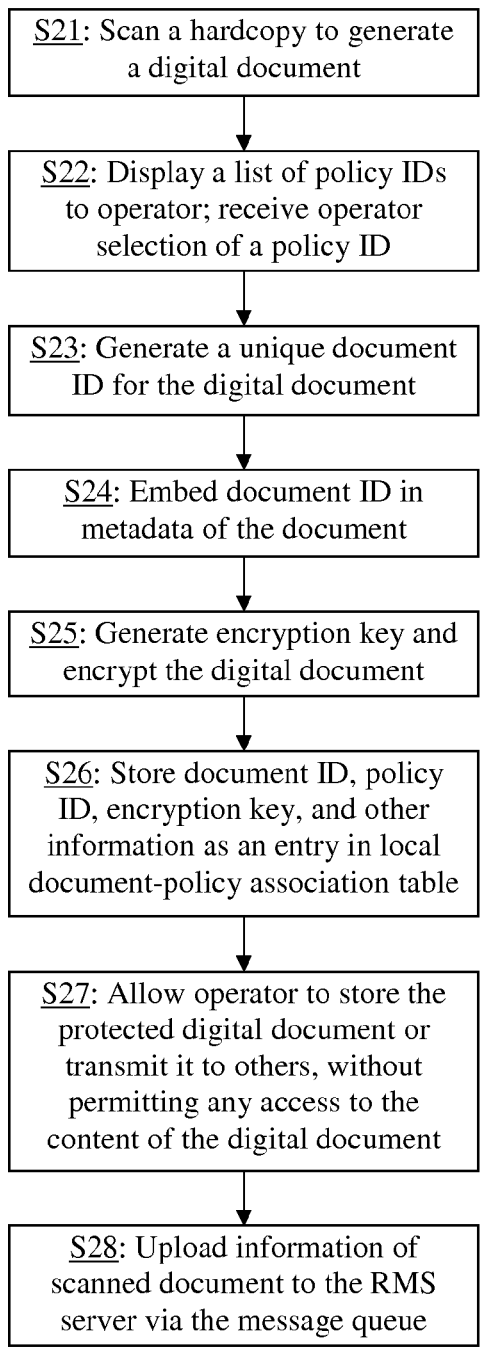
FIG. 2 schematically illustrates a method performed by a scanner device according to an embodiment of the present invention.
Figure 2:
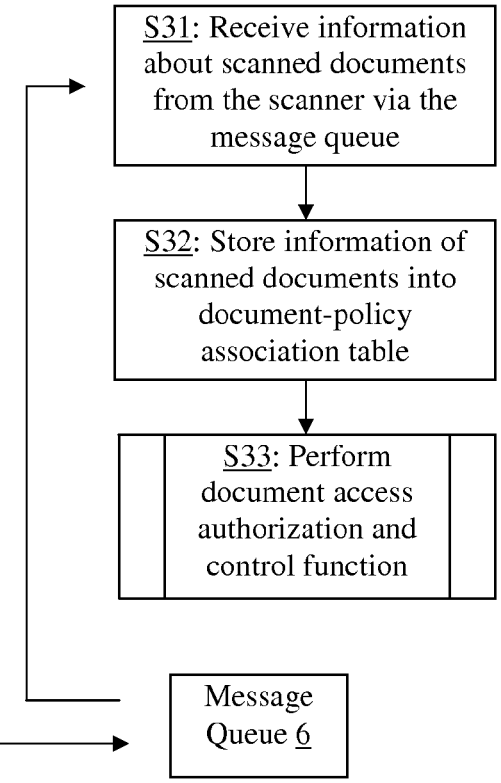

FIG. 2 schematically illustrates a process performed by the scanner device 2 (the control program 23, the DRM program 24 and the message queue synchronizer program 25) when scanning a hardcopy document according to an embodiment of the present invention. The scanner 2 scans a hardcopy document to generate a digital document (step S21). Using the user interface panel 26, the scanner displays a list of rights management policies to the operator and prompts the operator to select a policy to be applied to the digital document (step S22). To accomplish this, the scanner 2 stores in its storage device 27 a local policy table 28, which may be identical to the policy table 37 on the server 3 or may contain a subset of the policies in the policy table 37 on the server (see FIG. 3A). The local policy table 28 may be updated from time to time by the server 3. Alternatively, the scanner 2 may store only a list of policy IDs that are available for selection, rather than a policy table that contains the content of each policy.

The scanner generates a unique document ID for the digital document (step S23). The document ID is embedded in the document as a part of its metadata (step S24). In addition, an URL (Uniform Resource Locator) of the RMS server is also embedded in the metadata of the document in this step. The scanner also generates an encryption key and encrypts the digital document (step S25). Then, the scanner 2 stores the document ID, policy ID, encryption key, and other information (optional) about the document as an entry in a local document-policy association table 29 on the storage device 27 (step S25). The local document-policy association table 29 has a similar structure as the document-policy association table 38 on the server 3 (see FIG. 3B), but typically has a smaller number of entries because the local document-policy association table 29 will only contain entries for documents scanned by the particular scanner 2 while the document-policy association table 38 on the server 3 contains entries for digital documents from other sources.

It should be noted that the document ID generated in step S23 is unique not only within the scanner 2, but also within the entire DRM system which may include multiple scanners connected to the server 3 and performing similar scanning functions. This may be accomplished by using a naming scheme where the document ID is partly based on an ID of the scanner 2, so that document IDs generated by one scanner will always be different from those generated by other scanners. For example, the document ID may contain multiple characters where a subset of the characters represents the scanner ID, or the document ID may be a hash value where a part of the input of the hash function represents the scanner ID.

Steps S23 to S26 constitute the steps of applying rights management policy to the digital document; the resulting digital document is a protected digital document recognized in the DRM system. The operator is now allowed to store the protected digital document or transmit it to other users (step S27). However, the scanner does not permit any user to access the content of the digital document; authorization of access to the content of the document is controlled by the RMS server 3 as will be described later.

Steps S21 to S27 shown in FIG. 2 can be performed by the scanner 2 even when the RMS server 3 is not available over the network. The scanner can repeat steps S21 to S27 to scan additional documents. When the RMS server 3 becomes available, the scanner 2 uploads the information about newly scanned digital document(s) to the server 3 (step S28). For each document, the information uploaded to the server includes the various items stored in the local document-policy association table 29, including the document ID, policy ID, encryption key, etc.

The digital document itself may or may not need to be transferred to the RMS server 3 depending on system design. The server 3 does not require a copy of the digital document itself in order to perform access authorization (step S33, described later), but in some DRM systems, the server may store copies of all documents managed by it.

On the RMS server side, when the information about the scanned documents (e.g. document ID, policy ID, encryption key, etc.) is received from the scanner 2 (step S31), the server 3 stores it in the document-policy association table 38 on the server (step S31). Thereafter, when a user attempts to access a document, the server 3 can perform document access authorization functions in the conventional manner (step S33). More specifically, when the server 3 receives a request from a user computer 4 to access a digital document, the request indicating a document ID for a digital document and a user ID of the requesting user, the server uses the document ID received from the user 4 to look up the document-policy association table 38 to determined the policy ID associated with the requested document, and then refers to the policy table 37 to determine whether the requesting user has access right to the requested document under that policy.

As shown in FIG. 2, the scanner 2 and the RMS server 3 may utilize a message queue 6 to exchange DRM-related information. The message queue 6 is an application and can be implemented on the RMS server 3, on the scanner 2, or on a separate server (in FIG. 1, the message queue 6 is depicted as being implemented on a separate server). A message queue synchronizer program 25 on the scanner 2 sends messages containing the relevant information to the message queue. A message queue synchronizer program 34 on RMS server 3 keeps monitoring the message queue; when new messages arrive on the message queue, it reads the messages and updates the various database tables on the server. If the message queue is temporarily unavailable to the scanner and/or the server (for example the message queue is implemented on the server and the server is not available to the scanner over the network), the message exchange can proceed after it becomes available.

To implement the information exchange via a message queue, the scanner is configured with the public key and the server address for the message queue (if the message queue is implemented on a separate server), and/or the public key and server address for the RMS server.

In addition to the local policy table 28, the scanner 2 may also store other information useful for the DRM system, such as a local registered user database similar to the registered user database 36 on the server. The server 3 may update the local policy table 28 and other database tables on the scanner 2 from time to time, for example by using the message queue 6. For example, the message queue synchronizer 34 on the RMS server 3 may monitor the registered users database 36 and policy table 37, and when any changes in these tables occur, send a message to the message queue 6 containing the update information. The message queue synchronizer program 25 on the scanner 2 may continuously monitor the message queue, read new messages from the message queue and update the corresponding database tables on the scanner. This way, the RMS databases on the scanner and the RMS database on the server are always synchronized. The dashed lines with double arrows in FIG. 1 schematically indicate the information flow to and between the message queue 6 and the scanner 2 and server 3.

To summarize, the steps of applying rights management policies to the scanned digital documents, i.e. steps S23 to S26 in FIG. 2, which are conventionally performed by an RMS server, are now performed by the scanner 2 without the involvement of the server 3. Thus, even if the RMS server is down, the scanner can still allow the operator to scan documents and apply rights management policies to protect the scanned documents. Note that because the RMS server is needed to authorize access to documents by users (i.e. step S33, which is only performed by the RMS server 3 and not performed by the scanner 2), before the information about the newly scanned digital documents is uploaded to the server 3, users will not yet be able to access these documents. As soon as communication between the scanner 2 and server 3 is established, the information about the newly scanned digital documents can be uploaded to the server, and users are now able to access these documents via the document access authorization function of the RMS server 3.

Although a message queue is a convenient way of implementing information exchange between the server 3 and scanner 2, it is not essential and other method of information exchange may be used.

In one embodiment, the scanner 2 performs the steps of applying right management policies only when the RMS server is not available at the time the operator wishes to scan a document; if the RMS server is available, the steps of applying right management policies are performed by the server in the conventional manner. In other words, if the RMS server is available at the time the operator wishes to scan a document, the scanner sends the scanned digital document to the server, and receives the protected version of the document back from the server. In another embodiment, even when the RMS server is available, the steps of applying right management policies are still performed by the scanner. The latter is advantageous particularly when the RMS server is connected with the scanner by the Internet (when the server is in the "cloud"), because it is faster and uses less network bandwidth. Using the conventional method, the scanned digital documents are sent from the scanner to the RMS server, where the server applies DRM protection to them and sends the protected documents back to the scanner. When the scanned digital files have large sizes, file transfer over the Internet may take too long, and the scanning operation may even fail due to timeout caused by long file transfer time. The method of this embodiment also uses less network bandwidth because the digital documents do not need to be transferred over the Internet multiple times. When the DRM system is designed such that copies of the digital documents are not kept by the server, there will be no need to transfer the documents to the server at all.

As described earlier, when an operator scans a document, the scanner displays a list of right management policies to the operator and the operator selects one policy to be applied to the scanned digital document (step S22). In some embodiments, the list of policies that are displayed to the operator which the operator can select from may be restricted in order to enhance security. This is useful in situations, for example, where the scanner is located in a space where confidential documents are kept and where physical access is controlled. In such a situation, it would be undesirable if an operator can scan a confidential document, then apply a relatively non-restrictive policy to the digital document such that the digital document can be widely viewed by users who are not supposed to have access to it.

Thus, according to an embodiment of the invention, a table specifying an association between operator IDs and available policies is stored in the storage device 27 of the scanner. The list may be a subset of all policies in the policy table 37 of the RMS server. Different lists may be specified for different operators. In an example of a most restrictive case, an operator can select from only one policy, and that one policy gives only the system administrator access rights to the document. In such a case, operators can scan a document but cannot access the scanned digital document; the system administrator can later re-assign another policy to be associated with the document, before the information about the document is uploaded to the RMS server (step S28). Such measures will help in protecting documents as they are getting scanned; it ensures that as soon as a document is scanned, the scanned copy is protected and only allowed users can open and view it.

Note that the operators are often also users of the DRM system who are given various access rights to digital documents by the various policies. In this disclosure, the term "user" is used in the context of accessing the digital documents, and the term "operator" is used in the context of performing document scanning; but they are often the same people such as employees of an organization.

Further, the scanner can be set up to track all accesses made to scanned digital documents while they reside on the scanner, so that every operator action (viewing, printing, modifying, copying, etc.) is recorded. Tracking the audit trail of the scanned copies allows companies to keep track of who are using scanned copies and what they are doing with them like printing, modifying, copying, viewing, etc. The recorded tracking information may be later reported to the RMS server 3 and stored in the database there as a part of the access record of the document. Such tracking will be useful for industries controlled by e-document law, where original copies of scanned documents must be preserved even if the scanned documents are allowed to be modified. Using this method, as soon as the document is scanned, it is protected and all changes in the scanned copy are continuously tracked.

Although the above embodiments of the invention are described in the context of a scanner, the method can also be implemented on a mobile device such as a smart phone or tablet computer which has a camera capability.

Moreover, in DRM systems, often a computer, which may be another server or a client computer, may generate digital documents (such as PDF documents) by means other than scanning a hardcopy document, and submit such digital documents to be managed by the RMS server 3. For example, a document may be generated by a word processing program and then converted to PDF. The method described above can be applied to such a DRM system as well. In other words, the scanner 2 shown in FIG. 1 may more generally be any digital document generation apparatus, including but not limited to scanners, computers, digital cameras, etc.; step S21 is more generally a step of generating a digital document by any suitable means; and steps S21 to S28 are performed by the digital document generation apparatus 2. Such a system and method are different from conventional DRM systems and methods in that, in the conventional DRM systems and methods, only the RMS server 3 which performs the steps of document access authorization (step S33) can perform the steps of applying rights management policies to digital documents (steps S23 to S26), while in the present embodiments, the steps of applying rights management policies to digital documents can be performed by a digital document generation apparatus 2 that does not perform the steps of document access authorization. The system and methods of the present embodiments have the advantage that rights management policies can be applied by the digital document generation apparatus 2 even when the RMS server 3 is not available to the apparatus 2. This advantage is significant when the embodied invention is implemented in a digital document generation apparatus 2 shared by a multiple users, such as an MFP. That is to say, because it is inconvenient for other users if one user (operator) occupies the shared MFP for a long time. By using the embodied invention, a delay in applying rights management policy in a scan job due to the failure of connection to RMS server 3 can be avoided, which results in that the time occupied by the scan job operator can be minimized.

It will be apparent to those skilled in the art that various modification and variations can be made in the digital rights management method and related apparatus of the present invention without departing from the spirit or scope of the invention. Thus, it is intended that the present invention cover modifications and variations that come within the scope of the appended claims and their equivalents.

What is claimed is:

1. A method implemented in a system comprising a digital document generation apparatus connected to a digital rights management server via a network, the digital document generation apparatus being a scanner or a mobile device with a camera, for managing digital rights of digital documents generated by the digital document generation apparatus, the method comprising:
   by the digital document generation apparatus:
   (a) storing a plurality of right management policies in a storage device local to the digital document generation apparatus, each right management policy defining user access rights with respect to digital documents with which the policy is to be associated;
   (b) generating a digital document by scanning a hardcopy document using the scanner or photographing a hardcopy document using the camera;
   (c) receiving an operator input indicating a policy ID of a selected one of the plurality of rights management policies;
   (d) generating a unique document ID for the digital document;
   (e) embedding the document ID and information identifying the digital rights management server in metadata of the digital document;
   (f) encrypting the digital document using an encryption key;
   (g) storing the document ID, the policy ID and the encryption key as an entry in a local document-policy association table in the storage device local to the digital document generation apparatus;
   (h) storing or transmitting the encrypted digital document to a user, without permitting any access to content of the digital document; and
   (i) transmitting, after step (h), the document ID, the policy ID and the encryption key to the digital rights management server.

2. The method of claim 1, further comprising:
   by the server:
   (j) storing a plurality of right management policies in a storage device of the server, each right management policy defining user access rights which specifies a plurality of users having access rights to digital documents with which the policy is to be associated;
   (k) receiving the document ID, the policy ID and the encryption key from the digital document generation apparatus; and
   (l) storing the document ID, the policy ID and the encryption key as an entry in a document-policy association table in the storage device of the server.

3. The method of claim 2, further comprising:
   by the server:
   (m) receiving a request for access from a user computer, the request indicating a document ID of a digital document to be accessed and a user ID of a requesting user;
   (n) determining a policy ID associated with the document ID by referring to the document-policy association table in the storage device of the server;
   (o) determining an access permission of the requesting user by referring to the policy table using the policy ID and the user ID; and
   (p) transmitting a reply to the user computer based on the access permission determined in step (o).

4. The method of claim 1, wherein the digital document generation apparatus is a scanner device, and wherein step (b) comprises scanning a hardcopy document to generate the digital document.

5. The method of claim 4, wherein step (c) includes:
   displaying at least a subset of the stored plurality of rights management policies to an operator; and
   receiving an operator input selecting one of the displayed policies.

6. The method of claim 5, wherein the policies displayed to the operator are dependent on an operator ID of the operator.

7. The method of claim 2, wherein in step (i), the digital document generation apparatus transmits the document ID and the policy ID to the digital rights management server via a message queue, and in step (k), the server receives the document ID and the policy ID from the digital document generation apparatus via the message queue.

8. A scanner connected to a digital rights management server via a network, comprising:
   a scanning section for scanning hardcopy documents to generate digital documents;
   a user interface for display information to and receiving input from a user;
   a storage device storing a plurality of right management policies, a document-policy association table and a plurality of digital documents, the document-policy association table defining an association of each of the plurality of digital documents with one of the rights management policies, each right management policy defining user access rights with respect to digital documents with which the policy is associated;
   a non-transitory memory storing computer-readable program code;
   a processing section executing the program code stored in the non-transitory memory to perform a process which comprises:
   (b) controlling the scanning section to scan a hardcopy document to generate a digital document;
   (c) via the user interface, receiving an operator input indicating a policy ID of a selected one of the plurality of rights management policies;
   (d) generating a unique document ID for the digital document generated in step (a);
   (e) embedding the document ID and information identifying the digital rights management server in metadata of the digital document;
   (f) encrypting the digital document using an encryption key;
   (g) storing the document ID, the policy ID and the encryption key as an entry in the document-policy association table in the storage device;

(h) storing the digital document in the storage device or transmitting the digital document to a user, without permitting any access to content of the digital document; and (i) transmitting, after step (h), the document ID, the policy ID and the encryption key to the digital rights management server.

9. The scanner of claim 8, wherein step (b) includes:
displaying at least a subset of the stored plurality of rights management policies to an operator; and
receiving an operator input selecting one of the displayed policies.

10. The scanner of claim 9, wherein the policies displayed to the operator are dependent on an operator ID of the operator.

11. A computer program product comprising a computer usable non-transitory medium having computer readable program code embedded therein for controlling a digital rights management server which is connected to a digital document generation apparatus via a network, the computer readable program code being configured to cause the digital rights management server to execute a process for managing digital rights of digital documents, wherein the process executed by the digital rights management server comprises:

(j) storing a plurality of right management policies in a storage device of the server, each right management policy defining user access rights which specifies a plurality of users having access rights to digital documents with which the policy is to be associated;

(k) receiving, from the digital document generation apparatus using a message queue, a document ID, a policy ID and a encryption key for a digital document generated by the digital document generation apparatus;

(l) storing the document ID, the policy ID and the encryption key as an entry in a document-policy association table in the storage device of the server;

(m) after step (l), receiving a request for access from a user computer, the request indicating a document ID of a digital document to be accessed and a user ID of a requesting user, wherein the digital document has been generated by the digital document generation apparatus;

(n) determining a policy ID associated with the document ID by referring to the document-policy association table in the storage device of the server;

(o) determining an access permission of the requesting user by referring to the policy table using the policy ID and the user ID; and (p) transmitting a reply to the user computer based on the access permission determined in step (o).

\* \* \* \* \*